United States Patent Office 2,704,298
Patented Mar. 15, 1955

2,704,298

MANUFACTURE OF ALKOXY-ALDEHYDES

Frederick James Bellringer, Wimbledon, London, Thomas Bewley, Epsom, and Ronald Herbert Smith, Epsom Downs, England, assignors to The Distillers Company Limited, Edinburgh, Scotland, a British company No Drawing. Application September 9, 1952, Serial No. 308,718

Claims priority, application Great Britain May 22, 1950

4 Claims. (Cl. 260—602)

The present invention relates to the production of substituted aldehydes and in particular to the manufacture of methoxy and beta-ethoxy propionaldehydes.

It is known that beta-alkoxy aldehydes are formed by reacting alpha-beta unsaturated aldehydes with saturated aliphatic alcohols in an alkaline reaction medium at low temperatures. The separation of the beta-alkoxy aldehydes formed in the process from the excess alcohol used was, however, considered impossible so that they could not be isolated and in consequence their properties were not ascertained. Only quite recently (Angew. Chemie 62 (1950), pages 105–116), Schultz and Wagner succeeded in isolating certain aldehydes in a pure form after their preparation by a different method. The authors state in the same publication that the yields of alkoxy aldehyde when produced in the manner indicated above because of the extreme sensitivity towards alkali of the acrolein used was only about 20% of the theoretical and therefore so unsatisfactory that this method is for practical purposes unuseable. They therefore suggest that for a technical production of beta-alkoxy aldehydes a 2-step process should be used consisting first in the conversion of the unsaturated aldehyde into beta-alkoxy acetals and, as second step, the hydrolysis of the said acetals into the free beta-alkoxy aldehydes.

It has now been found that certain beta-alkoxy aldehydes may be obtained in higher yields and with good efficiency calculated on the unsaturated aldehyde used, and in high concentrations and that the process even allows the recovery of the desired alkoxy aldehyde in a pure state if during the whole condensation reaction the alcohol is in considerable excess over the aldehyde and if the resulting reaction mixture is distilled between certain pH limits in such a manner that the mixture remains in contact with heated surfaces of the distillation equipment for as short a time as possible.

According to the invention therefore, the process for the manufacture and recovery of methoxy propionaldehyde or beta-ethoxy propionaldehyde comprises bringing a stream of acrolein into contact with a body of methanol or ethanol at a temperature of −15° to +30° C. in the presence in the reaction mixture of a small amount of an alkaline condensation agent, maintaining an excess of alcohol over acrolein in the reaction mixture, bringing the pH of the reacted mixture to betwen 2.5 and 7.5, separating the whole of the alkoxy propionaldehyde together with the unreacted alcohol from the salts in the reaction mixture by rapid distillation and subjecting the salt-free distillate to fractional distillation. The proportion of acrolein to alcohol used is preferably such that not more than 2% of free-aldehyde is present in the reaction mixture at any time. The optimum proportion depends to a certain extent upon the efficiency of the cooling syystem by means of which the heat generated by the strongly exothermic reaction is removed from the reaction mixture.

The temperatures during the reaction may vary within fairly wide limits. They depend to a certain extent on the ratio of alcohol to acrolein used, in as much as a higher ratio allows the carrying out of the reaction at a somewhat higher temperature. At these high temperatures however, the efficiency of the reaction that is the conversion of the acrolein into the desired beta-alkoxy aldehyde, gradually declines. How the alkoxylation reaction is influenced by the reaction temperature can be seen from Table 1, in which the results are given of experiments carried out at different temperatures with acrolein, and methanol, in the molar ratio of 1:6, in the presence of 1 gram of sodium hydroxide per litre of reaction mixture.

The term "conversion" signifies the per cent by weight of acrolein consumed during the reaction whilst the term "efficiency" signifies the per cent by weight of the acrolein consumed which is converted into the methoxy propionaldehyde.

Table I

| Temperature | 15° | 20° | 25° | 30° |
|---|---|---|---|---|
| Conversion of acrolein | 96.2 | 94.9 | 94.8 | 92.5 |
| Efficiency | 91.2 | 86.7 | 85.8 | 77.6 |

Under these conditions the monomeric condensation product beta-alkoxy aldehyde is formed in almost quantitative yields. This is surprising in view of the statements made in U. S. Patent 2,495,313, according to which acrolein even with a high alcohol to aldehyde ratio furnished only low yields of monomeric alkoxy aldehydes whilst a large part of the acrolein was converted into higher condensation products. In addition, the process of the condensation according to this invention dispenses with the necessity for operating in an oxygen-free atmosphere and in the presence of oxidation inhibitors which the U. S. patentees considered important for the preparation of a major proportion of monomeric condensation products.

The following Table II shows the results obtained by a variation of the proportions of acrolein to methanol in the condensation reaction for the production of beta-methoxypropionaldehyde.

Table II

| Molar ratio—methanol: Acrolein | Efficiency (acrolein to methoxypropionaldehyde) |
|---|---|
| | Percent |
| 3:1 | 78 |
| 5:1 | 84.2 |
| 6.6:1 | 89.5 |
| 8.25:1 | 97.0 |
| 10:1 | 100 |

As alkaline agent for the condensation the hydroxides of the alkali metals or their alcoholates may be used, in the latter case preferably the alkali metal alcoholates of those alcohols which are employed for the alkoxylation. Other alkaline condensation agents are, for instance, the hydroxides of alkaline earth metals such as barium hydroxide, and organic bases such as alkylamines and quaternary ammonium hydroxides, for instance, tetramethyl ammonium hydroxide, also pyridine and the like.

The concentration of the alkaline condensation agent in the reaction mixture may vary within wide limits and depends on a number of circumstances some of which are the particular unsaturated aldehyde used and its concentration in the reaction mixture, the nature of the condensation agent itself, the temperature prevailing during the condensation reaction and the time during which the reaction mixture is allowed to remain in the reactor.

The residence time in the reactor, on the other hand, is influenced by the way the reaction is carried out, namely, whether batchwise or in a continuous manner. The higher the concentration of the condensing agent in the reaction mixture the more rapidly the reaction proceeds. By prolonging the residence time in the reactor, on the other hand, the alkoxy aldehydes produced tend to react with further amounts of the unsaturated aldehyde with the consequent formation of higher condensation products. It is desirable to terminate the reaction in as short a time as possible. Since, however, the reaction is exothermic the concentration of the alkaline condensing agent which may be used with impunity without impairing optimum yield of the monomeric product will depend on the speedy removal of the heat produced by the reaction and therefore by the efficiency of the cooling system. A very convenient method of carrying out the reaction in a continuous manner comprises feeding the reactants into one end of a suitably cooled narrow tubular reactor. Such a device allows a very efficient removal of the heat and it is possible to use high concentrations of the alkaline condensation agent and thereby terminate the reaction within a few minutes. It has been found, for instance, that with a reactor of this type, wherein the residence time amounted to about 5 minutes a concentration of, for instance, 5 grams sodium hydroxide per litre of reaction mixture or even more gave good results.

Another convenient way for effecting the alkoxylation condensation in a continuous manner, is, for instance, by the use of a pot reactor provided with an agitating device and an overflow arrangement. Into the pot reactor the unsaturated aldehyde and a mixture of alcohol and alkaline condensing agent are continuously fed, while the reaction mixture overflows through the overflow device. Cooling coils are provided for an efficient removal of the reaction heat. In such a device the residence time may amount to half-an-hour or more and the concentration of the alkaline condensation agent in the reaction mixture is preferably less than 1 gram per litre when alkali metal hydroxide such as potassium hydroxide is used.

When the alkoxylation reaction is finished, acid is added to the reaction mixture at least in sufficient quantity to neutralise the alkaline condensing agent to the pH of 7.5, and depending on the acid used, may bring the pH of the solution to 2.5. This step is essential to prevent further condensation and to permit the recovery of the alkoxy aldehyde from the reaction product. In the case of strong mineral acids, pH values lower than about 6, lead to substantial resinification of the mixture, so that with these acids the reaction mixture has to be brought to a pH of between 6.5 and 7.5, with phosphoric acid on the other hand, the pH's as low as 4.0 may be tolerated without undue destruction of the alkoxy aldehyde in the distillation stages. When organic acids such as acetic acid, formic acid, or oxalic acid are used, the pH of the mixture may be brought as low as 2.5. The pH's of this alcoholic mixture may be obtained by the use of a capillator outfit using indicators such as Brom-cresol green, Brom-phenol blue, or Brom-thymol blue according to the value to be determined.

The concentration and/or isolation of the alkoxy aldehyde from the pH-adjusted solution presents, however, certain difficulties, even after careful neutralisation, as the distillation can lead to considerable losses which would nullify the special advantage gained by the almost complete conversion of the acrolein under the specific conditions of the condensation which form part of the process according to this invention. It has been discovered that these difficulties can be overcome by subjecting the product to a rapid distillation in such a manner that the reaction mixture to be distilled remains in contact with the heated surfaces of the distillation equipment for a time dependent on the pH of the mixture and not exceeding that specified below. Where the pH has been adjusted to between 6.5 and 7.5 the contact time of the reaction mixture with the heated surfaces of the distillation equipment of up to 20 minutes, preferably less than 10 minutes, can be tolerated. Where, however, the reaction mixture has been adjusted to lower pH's, the distillation should be carried out with a contact time of less than 30 seconds, preferably less than about 4 seconds for the lowest pH's. Such rapid distillations may be carried out as flash distillations or by means of a climbing or falling film evaporator.

It has however, been ascertained, that the pH value may, in some instances, change to some extent, during the distillation. This may be due either to some carbon dioxide, being generated, by reason of contamination of the commercial alkali metal hydroxide used as condensation agent with carbonate or else from some carbon dioxide absorbed from the atmosphere. The pH in the mixture being distilled thereby rises and the mixture may develop an alkalinity with consequent aldol formation thus reducing the yield of desired alkoxy aldehyde. However, by using pH's obtained by means of a suitable acid, which are not too near the neutral point, such pH rises are unlikely to be troublesome. Acids such as phosphoric acid and the organic acids usually form well buffered media in which these pH changes will be slight.

In the distillation in order to achieve maximum yields of the desired alkoxy aldehyde, it is necessary to separate all the volatile part of the reaction mixture from the salts derived from the alkaline condensing agent. This means that the whole of the formed alkoxy aldehyde together with the unreacted alcohol is removed.

The temperatures at which this rapid distillation is carried out are not critical. This can be seen from the following table which sets out the results obtained with a reaction mixture containing 25% of methoxy propionaldehyde in excess methanol together with salts derived from the condensing agent.

Table III

| Kettle Temp. | Residence time in kettle | Percent total recovery of methoxypropionaldehyde |
|---|---|---|
| 82° | 9.5 mins | 94.6 |
| 95° | 12.2 mins | 81.9 |
| 108° | 19.1 mins | 55.5 |
| 115° | less than 3 mins | 97.6 |

The desired alkoxy aldehyde may be finally isolated by fractionating the distillate from the rapid distillation. This is preferably carried out at atmospheric pressure in order to decompose any hemiacetal formed.

The excess alcohol recovered by the distillation contains some unchanged unsaturated aldehyde and also some of the desired alkoxy aldehyde and may be used without further purification for new batches or re-circulated when the process is carried out in a continuous manner.

It has further been found that the presence of copper metal or mild steel in the distillation equipment exerts a deleterious effect upon the yield. It is therefore preferred to exclude the use of these materials in the construction of the distillation plant. Stainless steel or aluminium may be used with advantage.

The following examples illustrate the manner in which the process of the invention may be carried out in practice:

Example 1

2,392 grams of crude acrolein (93.2%) equivalent to 39.8 moles was slowly run into a stirred reactor containing 12,814 grams (400 moles) of methanol and 46.5 grams (0.83 mole) potassium hydroxide as catalyst, at such a rate as to keep the temperature of the reaction mixture below −3° C. Concentration of acrolein in the reaction product did not exceed 0.5%. After practically all the acrolein had been reacted, the analysis of the reaction mixture showed that 3,330 grams (37.85 moles) of methoxy-propionaldehyde were produced, 32.0 grams (0.95 mole) of acrolein being unreacted, thus indicating a conversion of 97.7% and an efficiency of 97.4%.

The reaction product was neutralised whilst at the low temperature with aqueous phosphoric acid to a pH of 6.9, then fed through a filter where the precipitated salts were filtered off.

A portion of the reaction product containing 2,012 grams (22.88 moles) of methoxypropionaldehyde was fed into a film evaporator wherein the residence time was a few seconds. The vaporised methanol and methoxypropionaldehyde passed into a fractionation column whilst the high boiling products and the salts were retained and removed from the evaporator.

1,895 grams (21.54 moles) of concentrated beta-methoxypropionaldehyde (85.5%) were collected and run off from a kettle at the base of the fractionating column, whilst unchanged methanol, acrolein and a further 22 grams of methoxy propionaldehyde (0.25 mole) distilled over from the top of the column. Apart from this, 39.6 grams (0.45 mole) of methoxypropionaldehyde were present in the high boilers taken off from the flash evaporator.

Thus, 94.2% of the beta-methoxypropionaldehyde was recovered as an 85.5% weight/weight solution in admixture with water from the base of the still and 1.2% weight/weight of the methoxypropionaldehyde passed over the top with the methanol. The total overall efficiency calculated on the acrolein used amounted therefore to 97.3%.

*Example 2*

A condensation reaction mixture was prepared by slowly running 2,392 grams of crude acrolein into a reactor provided with an agitator and containing 12,814 grams of methanol and 46.5 grams of potassium hydroxide as catalyst at such a rate as to keep the temperature of the reaction mixture below minus 3° C. The concentration of acrolein in the reaction product did not exceed 0.5%.

The condensation reaction product was neutralised whilst at the low temperature with aqueous phosphoric acid to a pH which can be seen from the following table which also gives the contents of the charge to the distillation equipment and the amounts of methoxy propionaldehyde recovered with the yield in per cent.

| Run No. | Adjusted to pH | Feed in moles methoxy-propion-aldehyde | Distillate in moles methoxy-propion-aldehyde | Total methoxy-propion-aldehyde recovered, moles | Methoxy propion-aldehyde recovered, percent |
|---|---|---|---|---|---|
| 1 | 5.0 | 10.46 | 9.2 | 9.28 | 88.7 |
| 2 | 4.0 | 11.09 | 8.614 | 9.35 | 84.3 |
| 3 | 2.5 | 8.17 | 3.67 | 3.79 | 46.4 |

*Example 3*

A condensation reaction mixture was prepared as described in Example 2. To this was added acetic acid until the pH was 3.0 using a Brom-phenol blue as indicator. On distillation through a film evaporator with a residence time therein of less than 3 seconds, methoxy propionaldehyde was recovered with a yield of 91.6%.

To another batch of a reaction mixture of similar composition acetic acid was added until the pH was 6.3. The distillation resulted in a methoxy propionaldehyde recovery of 94.2%.

Similar results were obtained by substituting in the above examples other alkaline condensing agents as defined above for the potassium hydroxide. Beta-ethoxy propionaldehyde was produced in similar yields by substituting ethanol for the methanol in the above examples.

This application is a continuation-in-part of application Ser. No. 224,256, now abandoned.

We claim:

1. A process which comprises bringing a stream of acrolein into contact with a body of a primary aliphatic alcohol selected from the group consisting of methanol and ethanol at a temperature of −15° to +30° C. in the presence in the reaction mixture of a small amount of an alkaline condensation agent, maintaining an excess of alcohol over acrolein in the reaction mixture, buffering the reacted mixture and bringing the pH thereof to between 2.5 and 7.5 separating the whole of the alkoxy-propionaldehyde together with the unreacted alcohol from the salts in the reaction mixture by rapid distillation at substantially atmospheric pressure, in which the residence time of the distilland in the heated portion of the still is no more than 10 minutes, and subjecting the salt-free distillate to fractional distillation.

2. A process according to claim 1 wherein the combination of the aldehyde and alcohol is such that not more than 2% of free aldehyde is present in the reaction mixture.

3. A process according to claim 1 wherein, in the case where the pH is between 2.5 and 6.5, the residence time of the distilland in the heated portion of the distillation equipment is no more than 30 seconds.

4. The process in accordance with claim 1, in which the substance for bringing the pH of the reacted mixture to the desired pH is an acid selected from the group consisting of a strong mineral acid, phosphoric acid and a weak organic acid, and in which the pH is brought to 6.5–7.5 in the case of a strong mineral acid, 4 to 7.5 by phosphoric acid and in the case of an organic acid to 2.5–7.5.

References Cited in the file of this patent

UNITED STATES PATENTS

| 2,495,313 | Bludworth et al. | Jan. 24, 1950 |
| 2,504,680 | Gresham | Apr. 18, 1950 |
| 2,561,254 | Whetstone | July 17, 1951 |
| 2,600,275 | Smith | June 10, 1952 |

OTHER REFERENCES

Berkman et al.: "Catalysis," pp. 825–826, Reinhold Publ. Corp., New York, N. Y. (1940).